Figure 1A:
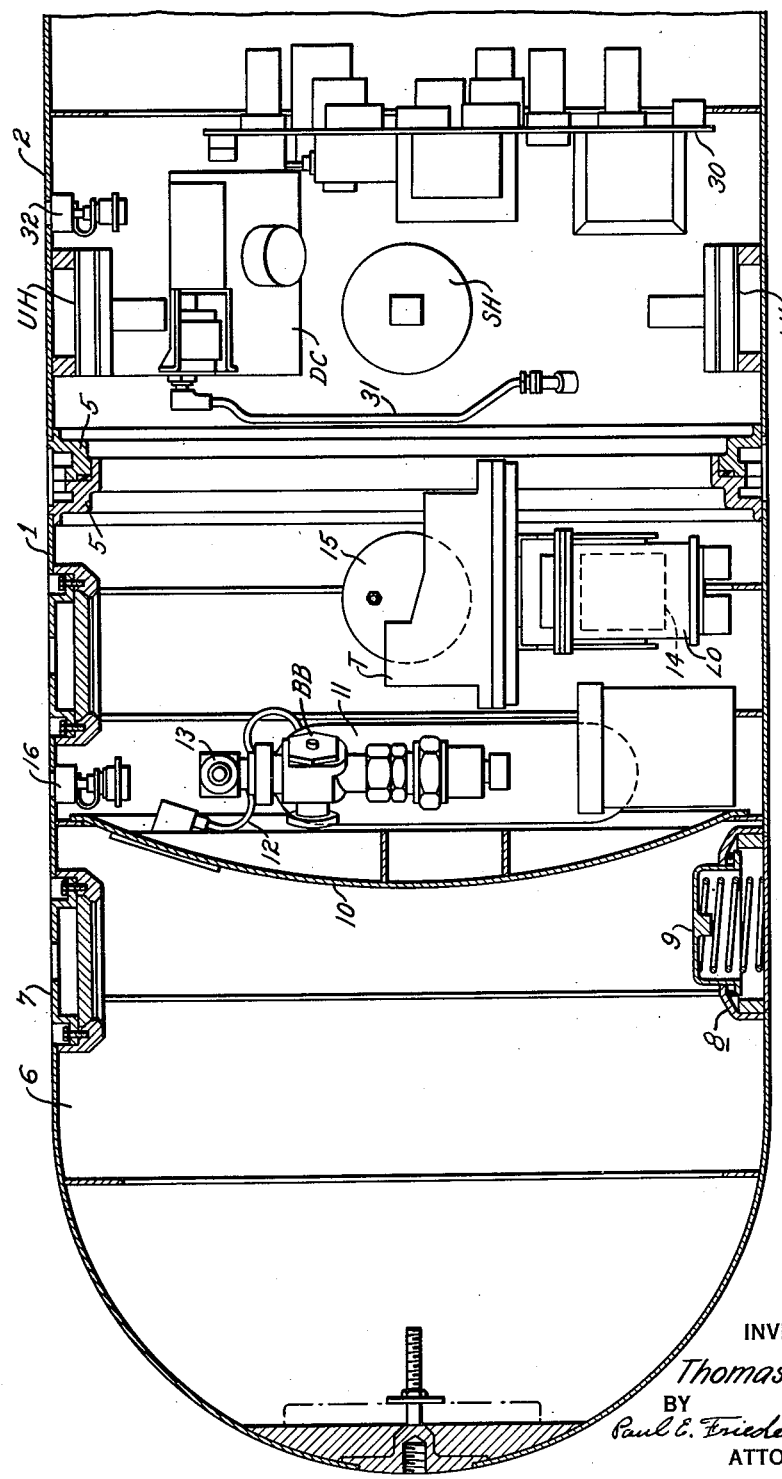

Oct. 23, 1951 T. A. DALY 2,572,116
SECTIONALIZED TORPEDO
Filed Oct. 7, 1946 4 Sheets-Sheet 1

INVENTOR
Thomas A. Daly.
BY
Paul E. Friedemann
ATTORNEY

Oct. 23, 1951     T. A. DALY     2,572,116
SECTIONALIZED TORPEDO
Filed Oct. 7, 1946     4 Sheets-Sheet 2

INVENTOR
Thomas A. Daly.
BY
Paul E. Friedemann
ATTORNEY

Oct. 23, 1951 — T. A. DALY — 2,572,116
SECTIONALIZED TORPEDO
Filed Oct. 7, 1946 — 4 Sheets-Sheet 3

INVENTOR
Thomas A. Daly.
BY
Paul E. Friedemann
ATTORNEY

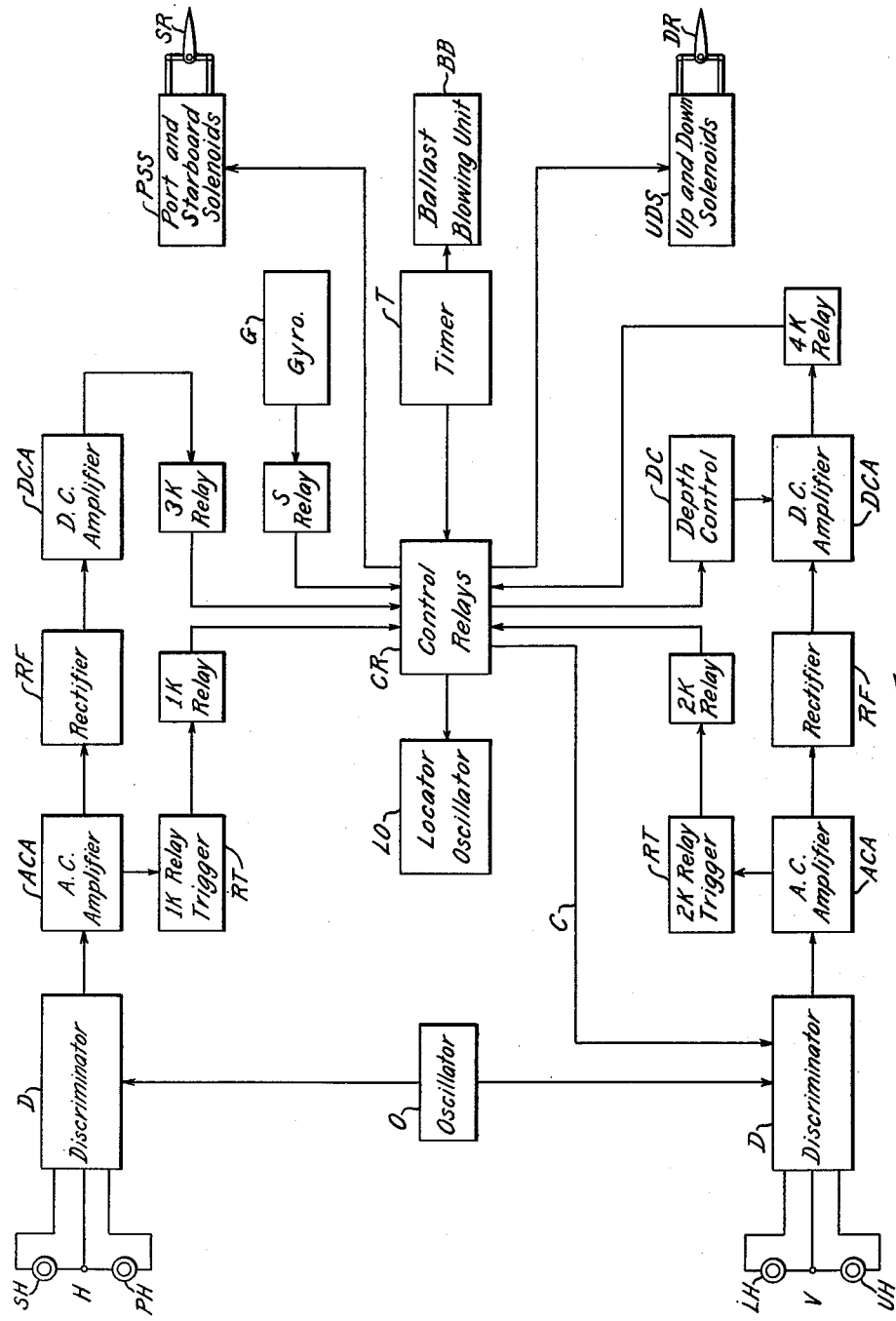

Patented Oct. 23, 1951

2,572,116

UNITED STATES PATENT OFFICE 2,572,116

SECTIONALIZED TORPEDO

Thomas A. Daly, Sharpsville, Pa., assignor, by mesne assignments, to the United States of America as represented by the Secretary of the Navy Application October 7, 1946, Serial No. 701,673

2 Claims. (Cl. 114—22)

This invention relates generally to electrically controlled and operated conveyances, and more particularly to electric torpedoes.

The specific torpedo illustrated in the drawings is of the aerial type, that is, the type which is designated for launching from an aircraft traveling at a speed of approximately 230 M.P.H. at an altitude of about 300 feet. Torpedoes of this type differ mainly from the submarine type in certain structural design features, since, dynamic loading thereof upon water entrance is high, and also in the matter of control functions. For the most part, however, considerations as to arrangement of the component parts, which aspect is essentially the subject matter of this invention, apply equally to the submarine types.

While all the development effort in the construction of a torpedo has for its aim the production of a highly effective torpedo for war shot purposes, it should be noted that the war shot torpedo is fired but once, and though the entire design consideration is directed to the meeting of war shot requirements, it is essential that the design incorporate features providing simplicity in manufacturing and ease of testing and servicing, of development, or test models, which ordinarily must be repeatedly fired and recovered.

In the design of a torpedo the question of mass distribution is of prime importance. There are certain components, for example, the electric propulsion motor and the propellers, which should be as closely located as possible to avoid unnecessarily long propeller shafts and the waste of space. To a large extent, this spacing is controlled by the motor diameter, it being perferably mounted in the tail cone of the torpedo. Similar considerations apply to the solenoids and rocker rings connected to the rudders which the solenoids drive. Considerably more latitude is had in the case of electrically connected components because of the flexibility of the wiring. To achieve proper balance, it is usually more convenient to properly distribute the electrical components of which the battery, which is quite heavy, is the most important factor.

Another consideration is the segregation of the test equipment from the equipment which is utilized in war shot torpedoes. In the instant case, the equipment common to both test and war shot types includes in general the battery, the propulsion motor and rudder actuating mechanisms together with the directional and depth controls therefor. The primary differences reside in the provision in the war shot type of an explosive head with suitable igniter and in the test type of what has come to be known as an exercise head having a liquid ballast chamber, evacuatable through a pressure responsive valve, a high pressure gas source for blowing the head to render the torpedo buoyant, a vibrator for transmitting vibrations into the water to aid in location and a timer and recorder for timing the sequence of operaton and recording performance in general.

With such an arrangement, it is possible to simulate war shot conditions in the test model and the performance of the equipment common to both types under operating conditions and other conditions resulting from the particular arrangement of the common components is thus accurately ascertained in advance. To convert a test model to a war shot model, it is only necessary to substitute the war head for the exercise head and eleminate a few test circuits. This procedure results in a torpedo assembly incorporating a preferred arrangement of control components giving optimum performance, in which the manufacture, assembly and testing is simply carried out.

One object of this invention is to provide a torpedo which is as simple as functional requirements permit and which is highly effective in operation.

Another object of this invention is to provide a torpedo for test purposes in which the equipment utilized for test purposes is arranged as a separate detachable unit.

Yet another object of this invention is to provide a torpedo which may easily be tested.

A further object of this invention is to provide a test torpedo which may be easily recovered.

A specific object of this invention is to provide a test torpedo in which the various control units which control the function of the torpedo when used in war shots are disposed in the positions to be occupied in war shot torpedoes, that tests thereof will indicate war shot performance that may be expected for the particular arrangement of control components.

Another specific object of this invention is to provide a test torpedo in which the control equipment of the torpedo is arranged along the length of the torpedo, except for the nose portion, and the test equipment which controls the function of said control equipment together with other devices useful in the test procedure is arranged in the nose portion.

The foregoing objects are merely illustrative of the various aims and objects of this invention.

Figure 1B:
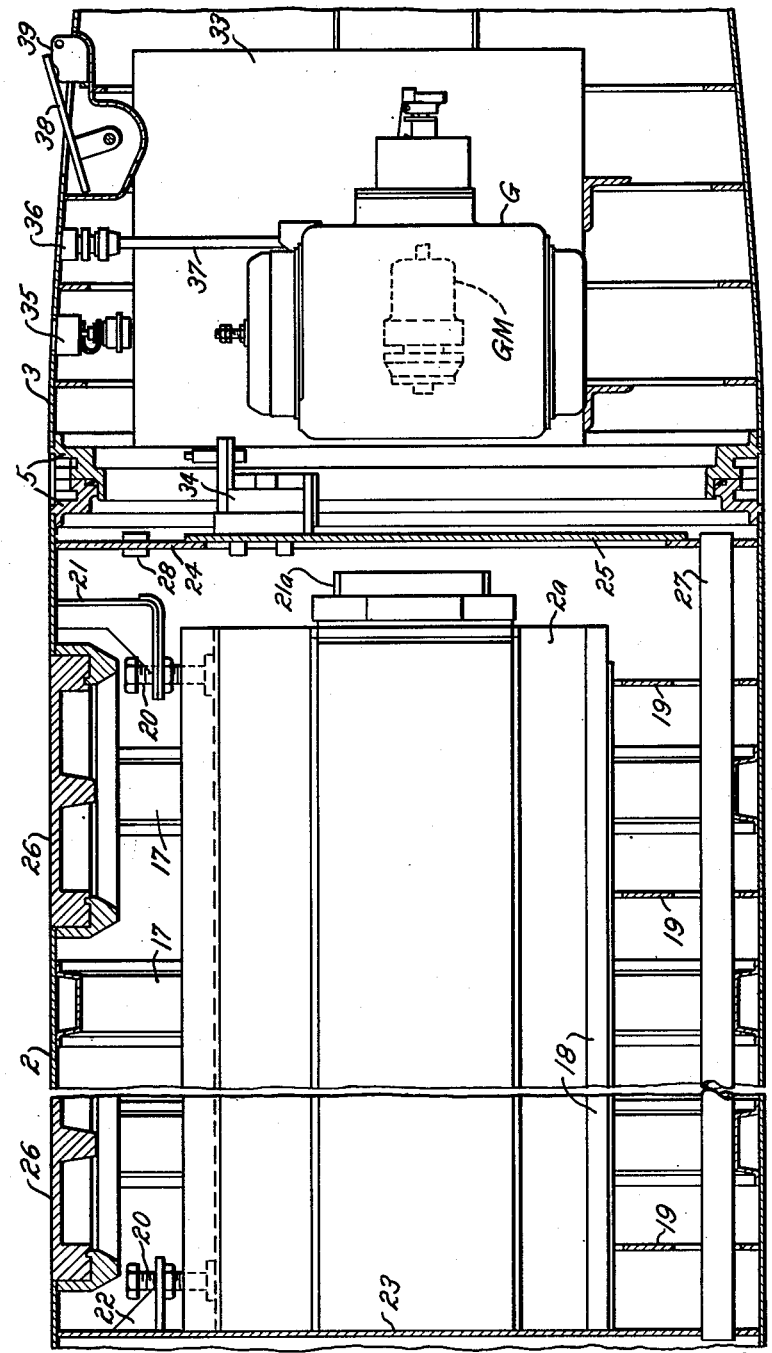
Figure 1C:
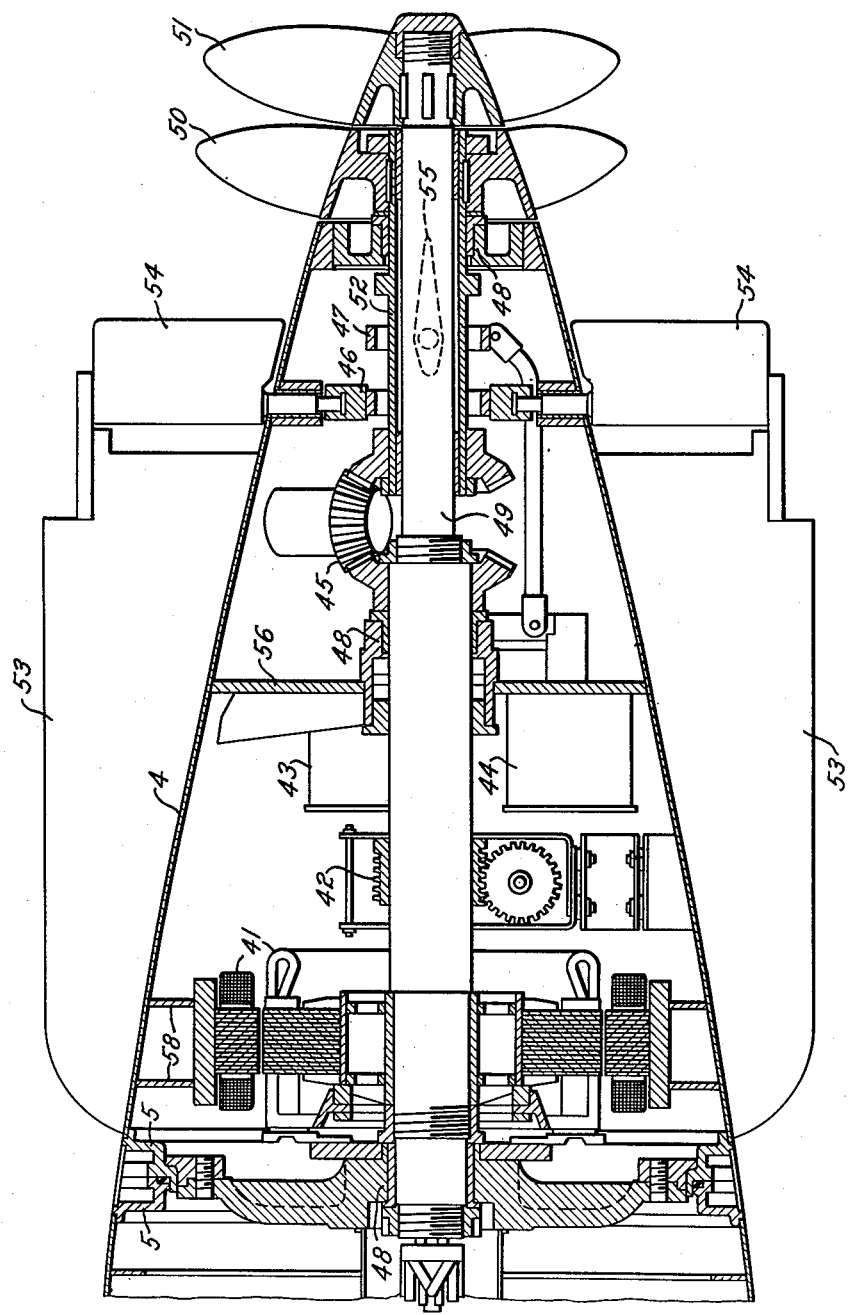

Other objects and advantages will become apparent upon a study of the following specification when considered in conjunction with the accompanying drawing, in which:

Figs. 1a, 1b and 1c taken together illustrate the torpedo embodying this invention, and Fig. 2 is a block diagram illustrating the electrical relationship of the electrical components of this invention.

A better understanding of this invention will probably be had if a general discussion of the torpedo is first presented. This torpedo is essentially an electrically operated acoustically controlled device. The acoustic control, however, is effective to control the torpedo only after the lapse of a predetermined time interval from the time of launching, and then only in the event that the acoustic signal is sufficiently strong to properly actuate the acoustic control. Initially the torpedo is controlled directionally by means of a gyroscope and for proper depth by suitable pressure responsive apparatus which may be preset for the desired depth of operation. Hard over to hard over rudder control is provided both in the case of the gyroscope and pressure responsive control and in the acoustic control.

The foregoing general functions are accomplished in the control system illustrated in block diagram form in Fig. 2. Since elements of the control per se form no part of this invention, no effort has been made to illustrate the details thereof. Further, it is only the purpose of this disclosure to present the overall function. As previously noted, solenoids are utilized to actuate the steering and depth rudders SR and DR, the usual practive being to utilize two solenoids, represented by block PSS, for steering, disposed in diametrically opposite relation to exert pulling forces on opposite sides of the steering rudder rocker ring and to utilize two solenoids, block UDS, for depth control in a similar manner. A gyroscope G controls the port and starboard solenoids PSS through a circuit system including relay S controlled by the gyroscope and the control relays CR, whereby either the port or starboard solenoid is energized depending upon the direction of angular displacement of the longitudinal axis of the torpedo in a horizontal plane with respect to the gyroscope spin axis. The depth control DC energizes either of the up and down solenoids to provide operation at the proper depth. Depth control DC drives amplifier DCA in the vertical channel, which under the instant conditions when the depth control is active is not energized by the output of rectifier and filter RF. The depth control DC controls the amplifier DCA for example, to cause an output thereof if the torpedo is not sufficiently deep or if too deep to bias the amplifier to cutoff. Control relay 4K in response to this control actuates the up and down solenoids UDS to effect operation at the proper depth. It will be seen from this that the path of the torpedo in both the horizontal and vertical control planes will be approximately sinusoidal because of the hard over to hard over nature of the control.

The electronic acoustic control includes two amplifying channels, the one designated H being the horizontal channel and the one designated V being the vertical channel. Each channel includes a pair of hydrophones which may be of the crystal type. In the horizontal channel these are designated PH and SH and respectively represent the port hydrophone and the starboard hydrophone. In the vertical channel the designations are UH and LH, respectively, for the upper and lower hydrophones. The function of the horizontal and vertical channels insofar as the handling of the hydrophone signals is concerned is identical, hence, a discussion of the horizontal channel will suffice for both.

The signals generated by the hydrophones in the horizontal channel are fed to the discriminator D. The output of the discriminator circuit under the control of oscillator O alternately includes a signal from the respective hydrophones PH and SH. The discriminator output is next passed to the alternating current amplifier ACA where the signals are amplified. From the amplifier ACA the signals pass to the rectifier and filtering circuit RF which is constructed and arranged, for example, to pass only the positive portions of the signals from hydrophone PH and only the negative portions of the signals of hydrophone SH. The opposed quantities thus produced are mixed and filtered and the resulting signal or quantity which is the differential of the rectified and filtered hydrophone signals is applied to the direct current amplifier DCA. Amplifier DCA is responsive to the magnitude and/or polarity of the quantities applied thereto, and by way of illustration, will pass current only when the polarity of the rectifier output is positive. If the rectifier output is negative, the amplifier DCA is biased to cutoff and its output is zero. Thus, further, by way of example, if the output of hydrophone PH predominates, the amplifier DCA will pass current which is utilized to energize control relay 3K. If the signal from the hydrophone SH predominates, the output of amplifier DCA is zero and relay 3K remains de-energized. The relay 3K is utilized in each of its two positions, through the control relays CR, to energize alternately the port and starboard solenoids designated by block PSS to operate the steering rudders between their two extremes of movement. Analogous considerations apply to the vertical channel V with the exception that the up and down solenoids are controlled directly by the function of the 4K relay.

A ballast blowing unit BB is utilized in test torpedoes and is set off by the timer T at the end of the test run. Its function is to exhaust the liquid ballast from the torpedo ballast section to render the torpedo buoyant, thus facilitating recovery.

The foregoing discussion covers generally the control of the torpedo afforded by the acoustic and gyro control devices in the horizontal plane and the acoustic and depth control devices in the vertical plane. These two controls do not operate together but in sequence, that is, either the depth control unit DC together with gyro G control the torpedo or the acoustic responsive system controls the torpedo. The operating sequence of the two controls is established by the timer T which, through the medium of certain of the relays in the control relay unit CR, connects the gyro G along with the depth control unit DC to the respective rudder solenoids, and at the same time, prevents the acoustic system from exerting its influence on the rudder solenoids. After a certain timed interval, circuits are established by the timer through the control relays to enable transfer to acoustic control but only if the acoustic signals are sufficiently strong to properly control the torpedo.

A more specific consideration of this control function will follow, but first it will be well to understand the reason for providing the selective control features. Present-day aerial torpedo strategy with conventional torpedoes requires that the torpedo plane approach the enemy vessel at a low altitude along the line of sight the torpedo is to travel to intercept the path of the vessel. Usually the torpedo plane is brought in quite close to the target ship, decelerated to a fairly low speed, roughly about 230 M. P. H., and thereafter the torpedo is launched. This practice is followed to assure a hit at fairly close range and to provide a sufficiently low speed to obviate damaging of the torpedo upon impact with the water. With this procedure the torpedo plane is very vulnerable to enemy fire.

With the torpedo of this invention, the torpedo may be launched at any point from the target up to its maximum range. During the first timed interval the torpedo will follow a course set by the flight path of the torpedo plane and maintained by the gyro steering with the depth control device causing operation at the proper depth. The range at which launching occurs may be considerably beyond the effective range of the acoustic control. When the first timed interval has elapsed, circuits are established by which a switch-over of torpedo control to the acoustic system may occur. If the acoustic signal from the enemy vessel is sufficiently strong, the torpedo under the influence of the acoustic control immediately begins tracking the source of the signal, the average position of the torpedo being repeatedly corrected in dependence of changes in position of the source of the acoustic signal until contact with that source is had. If the acoustic signal, once the switch-over connections from the initial control to acoustic control are set up, is yet too weak to adequately control the torpedo, the torpedo proceeds under the influence of the gyro and depth control until the acoustic signal reaches the required level. Thereafter, acoustic tracking occurs as explained above.

This function is achieved as follows: The discriminator circuit in the vertical channel is biased to cutoff by a control potential supplied through the control relays over conductor C. Hence, the output of the rectifier and filter circuit in the vertical channel is zero and no control of the associated direct current amplifier from the acoustic control source occurs. In the horizontal channel the control effect of relay 3K on the port and starboard solenoids is rendered inactive by open circuits through the control relays CR, the control relays being initially set up to complete circuits for the control of the rudder solenoids from the gyro G and the depth control unit DC. At launching, the gyro and depth control units direct the torpedo along the path of launching maintaining the required depth of operation. After a timed interval the timer establishes connections to cause the control relays to set up the switch-over circuits, meanwhile the torpedo proceeds under gyro and depth control. When the acoustic signals reach the required level, relay triggers RT in each of the horizontal and vertical channels cause the relays IK and 2K to operate and complete the switch-over connections. Relay IK causes the set up of final circuits for relay 3K to control the port and starboard solenoids while relay 2K, in effect, disconnects the depth control unit from the direct current amplifier in the vertical channel and permits the control of that amplifier from the acoustic signals. It will be noted that the relay triggers RT are ineffective until required acoustic signal levels are reached. Hence, acoustic control after the mentioned initial timed interval does not occur if the acoustic signal level is not sufficiently high. Thus, at no time is the torpedo under the influence of inadequate control. Further details of the control features of this torpedo will be found in the copending application of T. A. Daly and S. Kowalyshym, Jr., Serial No. 699,404, filed on the same date as this application, entitled Electrical Control System and assigned to the same assignee as this invention.

Since the foregoing discussion was directed primarily to the broad function and relation of the components of the torpedo, numerous details as well as the power supply for the system were not presented in Fig. 2. It will be understood, however, that such elements are contemplated.

The physical arrangement of the components of the torpedo of this invention is illustrated in Figs. 1a, 1b and 1c viewed together. The hull of the torpedo is formed of four cylindrical fabricated sheet metal sections, respectively designated 1, 2, 3 and 4, provided with mating rings 5 in the juxtaposed extremities of the hull sections. These rings are provided with radially disposed slots which have open extremities to receive bolts whereby the sections are rigidly joined. Section 1, as illustrated, is the exercise head for application to test models and is provided with a ballast tank 6 to which access is had through hand hole 7 for loading with liquid ballast. A pressure responsive valve 8 having the movable pressure actuated element 9 provides the exhaust opening for the ballast chamber. The ballast blowing unit BB is supported on the aft bulkhead 10 of the ballast chamber. Essentially it is a high pressure gas bottle 11 which communicates with the ballast chamber through the pipe line 12. The diaphragm (not shown) which seals the gas bottle is punctured by means of a cartridge controlled mechanism 13 fired by the timer T at the end of the torpedo test run, as previously explained. The locator oscillator LO (in Navy parlance called a "pinger") disposed near the aft extremity of the exericse head is essentially a high frequency oscillator which is supplied by battery 14 and excites a diaphragm mechanism 15 disposed in the torpedo shell. Diaphragm pulsations are mechanically transmitted to the surrounding fluid medium and with suitable direction finding equipment with pickup submerged in the medium, the location of the torpedo at conclusion of the trial run is easily accomplished. The oscillator is energized by the oscillator switch 16 before the test run and begins operation immediately. However, the control relays by reason of the interlocking therewith, as explained in connection with Fig. 2, shut it down immediately until the test run is concluded, to obviate interference thereof with the response of the acoustic apparatus. It will be noted that no attempt has been made to illustrate electrical wiring. Such connections are deemed of secondary importance in view of Fig. 2 and would only confuse the illustration of the mechanical arrangement.

The battery compartment 2 is fragmentarily shown to avoid drawing repetition. This section is fairly large, however, to accommodate the large battery. This section is formed of a shell portion supported internally by a plurality of ribs 17 having channel sections. The battery 2a is supported in guides 18, carried by the ribs 19 and is securely clamped against movement by clamping bolts 20, in one instance, secured in bracket 21 depending from the upper portion of the shell, there being a plurality of such clamps along the top of the shell, and in another instance, secured in a bracket 22 carried by the forward bulkhead 23 of the battery compartment. Aft clamp 21a holds the battery against forward bulkhead 23. Aft bulkhead 24 of the battery compartment is provided with a large opening through which the battery is inserted, which opening is sealed by plate 25 and entrance to the battery compartment for battery connections and securing of the battery is had through hand holes 26. For the type of battery utilized, the compartment is entirely sealed during operation, electrical connections between components to the fore of the battery compartment and aft thereof being made through the tube 27 passing therethrough. Battery leads are brought out of the compartment through the bushings 28 in bulkhead 24.

Space is reserved in section 2 of the torpedo body ahead of the battery compartment for the installation of the acoustic control equipment. The upper and lower hydrophones UH and LH, respectively, are attached internally of the shell of section 2 in a vertical plane which includes the torpedo axis. The port and starboard hydrophones of which only the starboard hydrophone SH appears in the drawing, are similarly attached internally of the shell in a horizontal plane including the torpedo axis. The attachment of the hydrophones is such that each is subjected to vibrations in the surrounding fluid medium which act upon the torpedo shell. Hence, the hydrophones, which as previously explained may be of the crystal type, generate small electrical quantities which are proportional to the vibrations in the surrounding medium. Assuming a vibration source that is not directly intercepted by a projection of the torpedo axis, it readily becomes apparent that at least one, and likely two, of the hydrophones will be vibrated more vigorously than the others. This unbalanced hydrophone output will then, through the intermediate control equipment as explained in connection with Fig. 2, actuate the torpedo rudders in a direction to bring the torpedo to bear upon the source of vibration. By observation due to the symmetrical distribution of the hydrophones with respect to the torpedo axis and, hence, the torpedo propellers, it is apparent that the hydrophones' response to the vibrations of the torpedo's propellers will be equal for all practical purposes, and due to the nature of the associated control equipment, this response is cancelled or at least reduced to an ineffective level.

The electronic discriminating and amplifying equipment associated with the hydrophones is arranged upon a panel 39 suitably supported within the torpedo shell section 2, the respective horizontal and vertical channels illustrated in Fig. 2 not being distinguishable in this view. Depth control unit DC while not illustrated in detail in the instant case, includes a pressure responsive device of hydrostat, as a bellows, connected to the surrounding medium by means of a pipe line 31 extending through the torpedo shell and a pendulum which responds to torpedo tilting about a horizontal axis intersecting the center of gravity. By suitable mechanical or electrical interconnection the action of one element modifies the other to introduce the desired control stimulus into the system. Details of this device are unessential to the invention herein disclosed. However, the device may be of a type illustrated in the copending application of William B. Elmer, Serial No. 613,766, filed August 31, 1945, entitled Control System, and assigned to the same assignee as this invention. The action of the hydrostat and pendulum each modifies the other either mechanically as mentioned in the copending application of William B. Elmer, Serial No. 613,766, immediately above or electrically through a potentiometer system as described in the copending application of T. A. Daly and S. Kowalyshyn, Serial No. 699,040, hereinbefore mentioned. In the latter case, the output of the depth control unit DC is utilized to control the direct current amplifier DCA (see Fig. 2). Using the former type of mechanically-coupled pendulum and hydrostat, the depth control contacts energize the solenoid relays directly. By arranging the acoustic control unit to the fore of the battery compartment adjacent the extremity of housing or battery section 2 of the torpedo, the components thereof are readily accessible by simple detachment of exercise head 1, or through the associated hand hole 26, for adjustment or replacement of malfunctioning units. Switch 32 is provided for test purposes so that the acoustic circuits may be tested independently of the cooperating system elements. It is conveniently accessible from outside the torpedo and is located in the section housing the acoustic control. A main motor contactor 34 is secured to plate 25 covering the opening in bulkhead 24 to the battery compartment where convenient wiring to the battery leads supplying the motor may be had.

Afterbody section 3 of the torpedo includes the gyroscope steering device G together with a control panel 33, details of which are not shown. This panel includes such control elements as the control relays CR (see Fig. 2) and others, through which power distribution and control quantities to the electrical components of the torpedo are made. Also located in this section 3 are a ready switch 35, a water opening 36 communicating by pipe line 37 and a pressure responsive switch (not shown) on the control panel 33, and a trigger switch 38. Here again, details are omitted since the units may be of conventional design and it is only the purpose hereof to illustrate arrangement. However, details of the trigger switch 38 may be had upon reference to the copending application of Thomas A. Daly, Serial No. 579,229, filed February 22, 1945, now Patent No. 2,403,056 granted July 2, 1946, entitled Starting Devices, and assigned to the same assignee as this invention.

The ready switch is the first operated of the series of three switches which prepares the torpedo for operation. This switch is actuated prior to launching. Its general function is primarily to energize the electronic system to cause heating of the tubes thereof prior to launching and also to energize the gyro motor GM to bring the gyro up to speed. This latter function as well as the tube heating occurs in approximately 30 seconds after which the pilot trips the torpedo release. In falling from the plane, the trigger switch 38 is operated by suitable lanyard connection with the airframe and closes a circuit which unlocks the gyro. Since the gyro is a free spinning body tending always to orient itself in space in preset position irrespective of movements of its supporting structure and its position with respect to the torpedo axis prior to uncaging is fixed, it is apparent that a line of sight must be drawn on the target ship prior to uncaging, otherwise sighting after uncaging is of no avail, since, the torpedo upon launching will immediately correct its position to the original heading. Of course, the acoustic control could later correct the torpedoes heading but only if the torpedo was within active sound or vibration range. This could reasonably not occur though if the heading of the target ship and the torpedo were too divergent. Trigger switch 38 is shown in cocked position. It is so maintained by interference with movement thereof by the block 39 which is adapted for attachment to the torpedo plane by means of a lanyard. At launching, the block is jerked from the position shown and the trigger switch is tripped to closed position. Trigger switch 38 is in series in a circuit including the pressure switch which supplies power from the battery principally to the motor and also to certain other elements of the control system not energized by operation of the ready switch. The precaution of the pressure switch is taken, since, it would not be advisable to energize the torpedo with but the light propeller loading afforded by the atmosphere. Upon water entrance, when the torpedo arrives at a predetermined minimum depth the pressure switch is actuated energizing the motor and control elements. Depth control unit DC immediately takes hold to control the torpedo depth and the gyro steering device directs the torpedo on the course set. Later the acoustic control functions in the manner previously explained.

The tail cone assembly of the torpedo houses the propulsion motor 41, a shaft driven timer 42, rudder actuating solenoids 43 and 44, reversing gear unit 45, rocker ring and rudder drive assemblies 46 and 47 together with shaft bearings 48 and the propulsion shaft 49 journalled in the bearings. Coaxially mounted propellers 50 and 51 are respectively driven by shaft 52 on the output side of reversing gear 45 and the propulsion shaft. Fins 53 extending substantially along the length of the tail cone pivotally carry the extremities of the steering rudders 54. Depth rudders 55 are similarly supported by horizontal fins (not shown). The forward propulsion shaft bearing 48 is formed in a rigid bulkhead 56 designed to take the load of the motor armature and shaft assembly at water impact. This bulkhead forms a water-tight seal box, the reversing gears, solenoid plungers, and rudder linkage being immersed in sea water. The stator frame of the motor is rigidly secured to the tail cone shell by ribs 58 and thus adds its support to the tail cone. Shaft driven timer 42, while not usually functioning in the test unit, is utilized in war shot torpedoes, hence, it is essential to incorporate this unit in the test model design. Its function is similar to that of the timer T but it does not incorporate a recorder, it being designed mainly for fixed war shot requirements. Solenoids 43 and 44, respectively, actuate the steering rudder rocker ring 46 and depth rudder rocker ring 47. Because of the sectional view, only one solenoid in each of the control planes is indicated. It is to be understood that the upper solenoid and the port solenoid mentioned in connection with Fig. 2 are diametrically disposed of the illustrated companion solenoid. While a reversing gear type of drive is illustrated, it will be apparent that a counter-rotating motor as disclosed in the copending application of D. A. Guerdan and J. E. Bluman, Serial No. 631,394, filed November 28, 1945, now Patent No. 2,462,182 granted February 22, 1949, entitled Motors, and assigned to the same assignee as this invention, may be used.

From the foregoing, it is apparent that a torpedo is provided in which the arrangement of the components in readily separable sections greatly facilitates manufacturing, assembly and testing of the torpedo and that, further, components utilized in both test and war shot models are pre-arranged in a group and so tested in this relation, which is separate and distinct from the components involved only in test procedure. Testing is facilitated and the accuracy of interpretation of test data in terms of war shot performance is improved.

The foregoing disclosure and the showings made in the drawings are merely illustrations of the principles of this invention and are not to be interpreted in a limiting sense. The only limitations are to be determined from the scope of the appended claims.

I claim as my invention:

1. A semi-homing marine torpedo comprising in combination a plurality of mechanically discrete and separable sections, each providing a functional unit of the torpedo: said sections including a head section, a power source and homing intelligence section, a control section, and a propulsion section; said power source and homing intelligence section comprising an electrical power supply, and a homing intelligence system deriving its power from said supply for determining the bearing of a target from the torpedo and directing the course of the torpedo thereto; said control section comprising a gyroscopic stabilizer powered by said supply for stabilizing the torpedo on its launched course prior to activation of the homing system, and switching means for enabling a change-over from gyroscopic course stabilization to homing guidance; and said propulsion section comprising an electric propelling motor deriving its power from said supply, and means electrically operated by said gyroscopic stabilizer and said intelligence system for steering the torpedo; each of said sections further including a torpedo hull portion; and means for securing the hull portions of the several sections into a complete torpedo; the interrelation between operational parts located in different sections being effected solely through electrical connections therebetween, each section being thus unitized to provide for the ready testing thereof and the ready assembly of the several sections into a complete torpedo, the disassembly of the torpedo into its component sections, and the replacement of the component sections.

2. A marine torpedo comprising in combination four mechanically discrete and separable sections, each providing a functional unit of the torpedo: said sections including a head section, an electrical power supply section, a control section, and a propulsion section; said control section comprising means powered by said electrical supply for directing the torpedo course; said propulsion section comprising an electric propelling motor deriving its power from said supply, and means electrically operated by said directing means for steering the torpedo; each of said sections further including a torpedo hull portion; and means for securing the hull portions of the several sections into a unitary torpedo; the interrelation between operational parts located in different sections being effected solely through electrical connections therebetween, each section being thus unitized to provide for the ready testing thereof and the ready assembly of the several sections into a complete torpedo, the disassembly of the torpedo into its component sections, and the replacement of the component sections.

THOMAS A. DALY.

REFERENCES CITED

The following references are of record in the file of this patent:

UNITED STATES PATENTS

| Number | Name | Date |
|---|---|---|
| 638,463 | Just | Dec. 5, 1899 |
| 1,077,311 | Shonnard | Nov. 4, 1913 |
| 1,250,235 | Shonnard | Dec. 18, 1917 |
| 1,348,152 | Conlin | Aug. 3, 1920 |
| 1,803,530 | King et al. | May 5, 1931 |
| 2,094,997 | Lucich | Oct. 5, 1937 |
| 2,402,617 | Fetzer et al. | June 25, 1946 |